United States Patent [19]

Francis

[11] 4,424,452
[45] Jan. 3, 1984

[54] FLUID-DRIVEN POWER GENERATOR

[76] Inventor: Paul T. Francis, P. O. Box 66, Wareham, Mass. 02538

[21] Appl. No.: 340,760

[22] Filed: Jan. 19, 1982

[51] Int. Cl.³ .............................................. F03D 1/02
[52] U.S. Cl. ...................................... 290/55; 290/44; 290/52; 415/61; 416/124; 416/170 R
[58] Field of Search ................. 290/45, 1 C, 1 D, 52, 290/43, 44, 54, 55, 5 L; 415/2 A, 3 A, 61; 416/120, 124, 170 A

[56] References Cited

U.S. PATENT DOCUMENTS

| 447,725 | 3/1891 | Gray | 415/61 |
| 555,806 | 3/1896 | Dolsen | 415/61 |
| 757,800 | 4/1904 | Williams | 290/55 |
| 868,798 | 10/1907 | McLaughlin | 290/54 |
| 3,222,533 | 12/1965 | MacKay | 290/55 |
| 3,339,078 | 8/1967 | Crompton | 290/44 |
| 3,556,239 | 1/1971 | Spahn | 180/68 |
| 3,740,565 | 6/1973 | Welsey | 290/55 |
| 3,794,456 | 2/1974 | Jelusic | 415/122 |

FOREIGN PATENT DOCUMENTS 695519  8/1953  United Kingdom ............... 415/2 A

Primary Examiner—J. V. Truhe
Assistant Examiner—Shelley Wade
Attorney, Agent, or Firm—Blodgett & Blodgett

[57] ABSTRACT

Electric power generator for mounting on a vehicle or the like, consisting of a tubular shroud within which is coaxially mounted a spool, the space between the spool and shroud being a venturi and containing a plurality of spaced pairs of blade rings.

9 Claims, 3 Drawing Figures

FLUID-DRIVEN POWER GENERATOR

BACKGROUND OF THE INVENTION

In the attempt to make automobiles and other vehicles more efficient, it has been suggested that the wind flowing over the vehicle as it proceeds along the road may be used for generating electricity to charge the battery. This is true whether the vehicle be completely battery operated or whether the battery is simply the power source for the ignition of an internal combustion engine. It's particularly distasteful to waste the energy of the vehicle as it rolls downhill without making some use of it. Attempts have been made in the past to generate electricity from wind flow, but a number of problems have been presented when it was attempted to make a practical version of such a generator. These and other difficulties experienced with the prior art devices have been obviated in a novel manner by the present invention.

It is, therefore, an outstanding object of the invention to provide a wind-operated electrical generator which automatically increases the work output as power becomes available.

Another object of this invention is the provision of a wind-driven electrical generator which automatically decreases work output as the power available in the wind decreases.

A further object of the present invention is the provision of a fluid-operated electrical generator which utilizes a high percentage of the power available at all times while wasting very little energy in the process.

It is another object of the instant invention to provide a wind-driven electrical generator which provides a function similar to an infinite series of gear ratios between minimum and maximum electical output.

A still further object of the invention is the provision of a design of wind-driven electrical generator which may be specifically designed for a particular application by changing venturi dimensions and alternator gear ratios to make the unit highly adaptable to power-generating stations of low to medium capacity.

With these and other objects in view, as will be apparent to those skilled in the art, the invention resides in the combination of parts set forth in the specification and covered by the claims appended hereto.

SUMMARY OF THE INVENTION

In general, the invention consists of a fluid driven generator having a tubular shroud and spool mounted concentrically in the shroud. The inner surface of the shroud and the outer surface of the spool approach one another from an entrance and an exit end to form a venturi. A series of stator blade rings join the spool to the shroud and rotor blade ring is rotatably mounted on the spool adjacent each stator blade ring.

More specifically, the surface of the spool is frusto-conical, while the entrance end is provided with a generally ovoid nose that extends outside the shroud and the exit end is provided with a generally ovoid, anti-turbulance nose extending outside the shroud.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
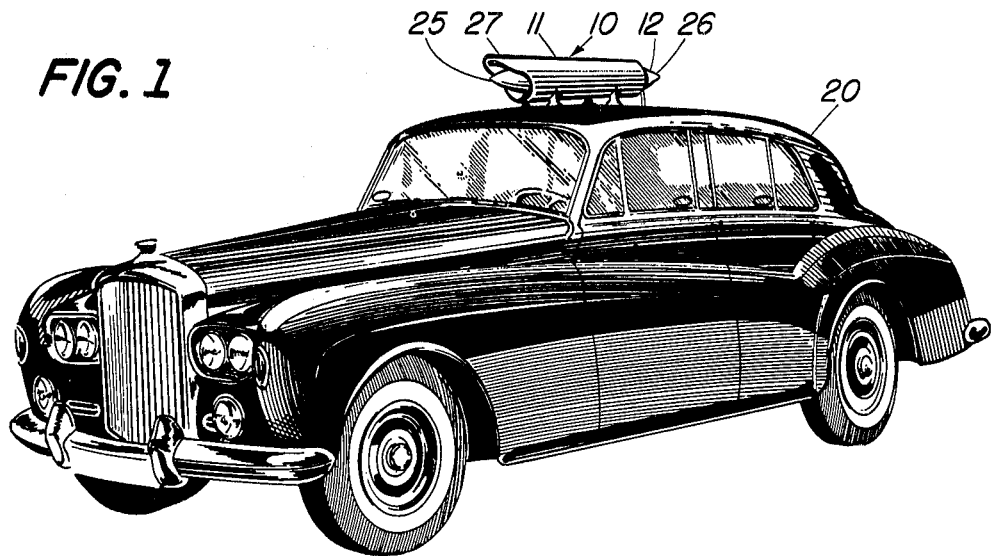
FIG. 1 is a perspective view showing a wind-driven electrical generator incorporating the principles of the present invention in use on a motor vehicle.

Referring first to FIG. 1, wherein are best shown the general features of the invention, the fluid-driven power generator, indicated generally by the reference numeral 10, is shown as mounted on the upper surface of the roof of a motor vehicle 20. Specifically, it is mounted on the somewhat rounded surface of the roof of the vehicle and the top of a rise. The generator is provided with a tubular shroud 11 which is concentrically mounted on a spool.

Figure 2:
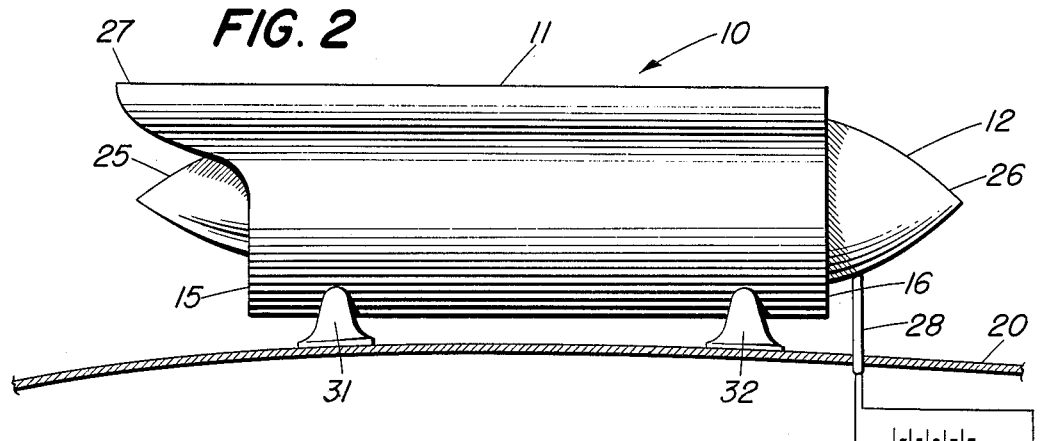
FIG. 2 is a side elevational view of the generator.

In FIGS. 1 and 2, it can be seen that the shroud 11 is provided with a hood 27 that extends forwardly thereof at the entrance end of the shroud. The spool 12 is provided with a nose 25 which extends out of the entrance end and with a nose 26 which extends out of the exit end. This end has the reference numeral 15, while the exit end has a reference numeral 16. A cable 28 emerges from the nose 26 of the spool and is connected to the battery 29 in the interior of the vehicle 20.

Legs 31 and 32 extend from the exterior of the shroud 11 to the roof of the vehicle 20 and hold it in a somewhat raised position above the roof surface.

Figure 3:
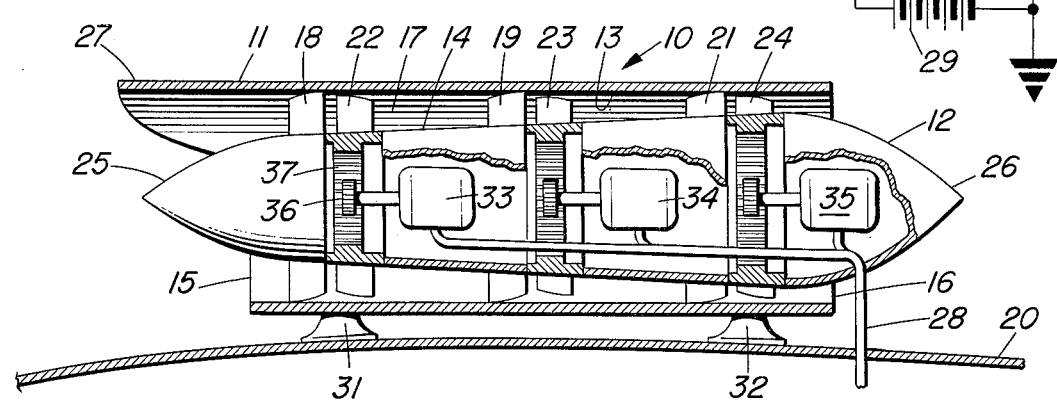
FIG. 3 is a vertical sectional view of the generator taken centrally thereof.

FIG. 3 shows the details of the invention including the fact that the inner surface 13, the shroud 11, and the outer surface 14 of the spool 12 approach one another from the entrance end 15 to the exit end 16 to form a venturi 17. A series of stator blade rings 18, 19 and 21 is shown in the venturi 17 and serve to join the inner surface of the shroud 11 to the spool 12. A rotor blade ring 22, 23 and 24 is rotatably mounted on the spool 12 adjacent each stator blade ring 18, 19 and 21, respectively.

The said inner surface 13 of the shroud 11 is cylindrical and the surface 14 of the spool 12 is tapered from the small diameter at the entrance end 15 to a large diameter at the exit end 16. Specifically, the surface 14 of the spool is frusto-conical with the large end at the rear. The nose 25 at the front is of a generally ovoid shape, while the nose 26 at the exit end 16 is also provided with a nose of generally ovoid, anti-turbulance shape.

In the preferred embodiment, the fluid which operates the generator is air and the stator and rotor blade rings 18, 19, 21, 22, 23 and 24 are formed to react to air flow in an effective manner. The hood 27 which extends from the entrance end 15 of the shroud 11 is located at the side opposite the vehicle and the air flow is somewhat diagonal to the axis of the shroud. A separate generator 33, 34 and 35 of an in spool 12 adjacent each of the rotor blade rings 22, 23 and 24, respectively. A pinion gear 36 is mounted on the shaft of the generator 33, while a ring gear 37 is mounted in the interior of the rotor blade ring 22. The cable 28 contains wires leading from the generators 33, 34 and 35 to the vehicle battery 29. A drive mechanism joins the generator 34 to its blade ring 23 and a similar drive mechanism joins the generator 35 to its ring 24. These drive means are similar in nature to the pinion gear 36 and the ring gear 37 associated with the generator 33 and joining it to its blade ring 22. In the preferred embodiment, the top surface of the vehicle 20 on which the generator is mounted has a convex curve with an upwardly-sloping portion of the curve facing forwardly of the vehicle. The entrance end 15 of the shroud 11 is located adjacent the upper part of the said upwardly-sloping portion of the roof curve.

The operation and advantages of the present invention will now be readily understood in view of the above discussion. As the vehicle 20 moves through the air, the air passes through the venturi 17 from the entrance end 15 to the exit end 16. This is also true when the vehicle is standing still and directed into a natural wind flow. A flow of air causes the rotor blade ring 22 to rotate on occasion and drives the generator 33 through the medium of the ring gear 37 and the pinion gear 36. Similarly, on occasion the rotor blade ring 23 rotates in its bearings and drives the generator 34, while the rotor blade ring 24 drives the generator 35. Since the rotation of these blades represents a resistance to the movement to the vehicle through the air. Means would normally be provided to cause the generators to be cut out as the vehicle moves uphill, thus preventing the blades from presenting resistance to movement. They would be cut back into operation again as the vehicle proceeds downhill and the generators serve, of course, to convert some of the potential energy of the vehicle at the top of a hill to kinetic energy and electrical power. The blades and the size of the venturi determine that the greatest wind flow will take place at the adjacent the rear exit end 16 of the venturi and would first cause the blade ring 24 in that position to drive its generator. The blade rings 22 and 23 would be non-rotated at lower speeds. Eventually, a speed of wind through the venturi 17 would cause the intermediate rotor blade ring to rotate and, finally, when a certain speed of wind flow is reached, the rotor ring blade 22 would begin rotating and cause its generator to generate electricity to charge the battery 29.

In calculating the amount of power available from the present invention it is useful to use formulae of the following nature:

Power in watts $= 0.00246 D^2 V^3$.

Horsepower $= 0.0000033\ D^2\ V^3$. This assumes the use of an ideal fan and D equals the diameter of the fan in feet and V = the wind velocity in miles per hour. An example would be the use of a frontal area of 78.54 square feet and the above formula shows that a ten-foot diameter fan horsepower output compared to a smaller fan at the exit of a venturi which provides a five times increase in wind velocity. The 78.54 square feet divided by 5 equals 15.7 square foot area for the venturi fan. 15.7 divided by $\pi$ equals the square root of 4.997 gives a 2.235 radius or a 4.47 diameter. Bringing this arithmetic forward, the horsepower of a standard fan at ten miles per hour would equal 0.33, while the horsepower of a venturi fan with the wind velocity multiplied by 5 would equal 8.24 horsepower. Similarly, with a 20 mile per hour wind the horsepower in a standard fan would be 2.64, while that of the venturi fan would equal 65.9. At 40 miles per hour the horsepower of the standard fan would be 21.12 and the horsepower of the venturi fan would be 527.2.

The use of the nose cone 25 increases the venturi effect while the exit cone 26 reduces turbulence in the wind leaving the vneturi. It should be noted that the stator blade rings 18, 19 and 21 and the rotor blade rings 22, 23 and 24 are of a standard nature used in the wind. Their exact nature is not part of the present invention.

The advantages of the present invention will now be readily understood. It is believed that the unique aspects of the invention reside in the fact that the unit consists of a plurality of turbines mounted in a venturi tube which increases the air flow speed. Each of the turbines is independently driven and is connected to an alternator or generator. Each turbine unit represents a different power stage and there is a different gear ratio for each stage. The ratios selected are such that it takes more energy to turn the first stage rotor than the second and more to turn the second than the third. At low velocity there is insufficient energy in the air stream to turn either first or second stage rotors, but the energy in the stream remains essentially intact although its path is curved and there will be some friction losses due to airflow direction changes around the motionless blades of the first two stages. However, due to the venturi formed by the turbines, spool and shroud, the wind velocity continues to accelerate and acquires sufficient velocity to turn the third-stage turbine.

Incidentally, the generator or alternator has a high end cut-out to prevent damage to overheating, so that after a certain number of revolutions per minute, the alternator produces no additional current and any excess power developed by the blades would be wasted. Calculations seem to show that each turbine stage will absorb approximately 45% of the kinetic energy in the wind stream when all stages are operating. Thus, the first stage absorbs 45% of the energy, the second 24.75%, and the third 13.6% for a total of 83.35%. The remaining 16.65% would at least be partially consumed by air and mechanical friction losses in the system.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Fluid-driven power generator, comprising:
    (a) a tubular shroud,
    (b) a spool mounted concentrically in the shroud, the inner surface of the shroud and the outer surface of the spool approaching one another from an entrance end to an exit end to form a venturi,
    (c) a series of stator blade rings joining the spool to the shroud,
    (d) a rotor blade ring rotatably mounted on the spool adjacent each stator blade ring, and
    (e) a separate generator mounted in the spool adjacent each rotor blade ring and joined to it by a separate drive mechanism, said drive mechanisms having different gear ratios and the gear ratios of the drive mechanisms being such that it takes less energy to turn each succeeding rotor blade from the entrance end to the exit end.

2. Fluid-driven power generator as recited in claim 1, wherein the said inner surface of the shroud is cylindrical and the surface of the spool is tapered from a small diameter at the entrance end to a large diameter at the exit end.

3. Fluid-driven power generator as recited in claim 2, wherein the surface of the spool is frusto-conical, wherein the entrance end is provided with a generally ovoid nose that extends outside the shroud, and wherein the exit end is provided with a generally ovoid anti-turbulance nose.

4. Fluid-driven power generator as recited in claim 3, wherein the fluid is air and the stator and rotor blades are formed to react to air flow.

5. Fluid-driven power generator as recited in claim 4, wherein a hood extends from the entrance end of the shroud at one side of the shroud.

6. Fluid-driven power generator as recited in claim 1, wherein each drive mechanism consists of a ring gear on the interior of the rotor blade ring and a pinion gear on the generator.

7. Fluid-driven power generator as recited in claim 1, wherein the shroud is provided with support legs to attach it to a top surface of a vehicle, and wherein an electrical cable joins the generators to a vehicle battery.

8. Fluid-driven power generator as recited in claim 7, wherein the top surface of the vehicle includes a convex curve, wherein an upwardly-sloping portion of the curve faces forwardly of the vehicle, and wherein the entrance end of the shroud is located adjacent the upper part of the said portion of the curve.

9. Air-driven turbine on a vehicle having a curved upper surface, comprising:
   (a) A tubular shroud mounted on the surface with an entrance end located adjacent the upper part of a forwardly-directed portion thereof, so that wind passing over the vehicle is directed along the said portion of the upper surface,
   (b) a spool fixedly mounted in the shroud concentrically thereof, the space between the shroud and the spool diminishing from the said entrance end to an exit end to form a venturi,
   (c) a series of mating pairs of rotor blade ring and stator blade ring located at spaced positions along the venturi,
   (d) a separate electrical generator associated with each said pair and connected to a battery in the vehicle, and,
   (e) a separate drive mechanism operatively connecting each rotor blade to its associated generator, said drive mechanisms having different gear ratios, and the gear ratios of the drive mechanisms being such that it takes less energy to turn each succeeding rotor blade from the entrance end to the exit end.

* * * * *